United States Patent
Smith

(10) Patent No.: US 8,977,057 B1
(45) Date of Patent: Mar. 10, 2015

(54) DETECTION OF DIACRITICS IN OCR SYSTEMS WITH ASSIGNMENT TO THE CORRECT TEXT LINE

(71) Applicant: Google Inc., Mountain View, CA (US)

(72) Inventor: Raymond Wensley Smith, Los Altos, CA (US)

(73) Assignee: Google Inc., Mountain View, CA (US)

(*) Notice: Subject to any disclaimer, the term of this patent is extended or adjusted under 35 U.S.C. 154(b) by 89 days.

(21) Appl. No.: 13/672,802

(22) Filed: Nov. 9, 2012

Related U.S. Application Data

(60) Provisional application No. 61/641,567, filed on May 2, 2012.

(51) Int. Cl.
*G06K 9/34* (2006.01)
*G06K 9/18* (2006.01)

(52) U.S. Cl.
CPC .................................... *G06K 9/18* (2013.01)
USPC .......................... 382/182; 382/173; 382/175

(58) Field of Classification Search
CPC ........................... G06K 2209/01; G06K 9/342
USPC .......... 382/182, 173, 175, 177, 185, 181, 225, 382/321, 199, 203
See application file for complete search history.

(56) References Cited

U.S. PATENT DOCUMENTS

| | | | |
|---|---|---|---|
| 6,920,240 B2 * | 7/2005 | Rodet et al. | 382/131 |
| 7,512,272 B2 * | 3/2009 | Mayzlin et al. | 382/185 |
| 8,249,356 B1 * | 8/2012 | Smith | 382/199 |

* cited by examiner

*Primary Examiner* — Sheela Chawan
(74) *Attorney, Agent, or Firm* — Dority & Manning, P.A.

(57) ABSTRACT

A system and method of assigning diacritics in an electronic image using optical character recognition (OCR) is disclosed. In one example, the method comprises analyzing, by a computer system, the electronic image to generate a plurality of bounding blocks associated with text lines within the electronic image. The method further comprises establishing a plurality of bounding boxes for diacritics and base text with the electronic image. The method also comprises determining a distance from a diacritic to a nearest base text character and a nearest text line. The method also comprises evaluating a base box distance and the nearest text line distance to assign the diacritic to a correct text line in the electronic image.

21 Claims, 9 Drawing Sheets

DETECTION OF DIACRITICS IN OCR SYSTEMS WITH ASSIGNMENT TO THE CORRECT TEXT LINE

BACKGROUND

Optical character recognition (OCR) typically uses computer software to process digital images of printed, typewritten, handwritten, or other written text, whether originally on paper, microfilm, or other medium, and to produce machine recognizable and editable text from the images. The images can be delivered by conventional scanners and/or images taken from cameras, phones, or video devices. The software usually includes an OCR engine that is implemented on computer hardware that processes image data to form text. The digital image of a document processed by the OCR engine may include multiple images of pages of written material. The images of the text to be processed by the OCR engine may be obtained by various imaging methods including using an image scanner to capture digital images of the text. The OCR engine analyzes the scanned image and produces an output document which includes the imaged document converted into standard character text.

SUMMARY

Various problems result from conventional approaches for converting images of printed, typewritten, handwritten, or other written text to standard character text. In one example, the characteristics of the languages in which documents are written vary significantly among a multitude of language types currently in use. In particular, accent marks appearing above or below certain characters in words in certain languages can affect the meaning and/or context of the words in which the accent appears. More generally referred to as diacritics or diacritic marks (also known as accents or combining marks), diacritics can be positioned above or below the main body letters on a text line. Diacritics are employed in a variety of languages in conjunction with standard characters to connote different meaning, different pronunciation, among other changes.

A significant problem in OCR and OCR systems is the organization of image connected components into text lines from imaged text. The presence of diacritics in a source document serves to complicate definition and assignment of text to text lines especially when processing image connected components. This process can be relatively straightforward for some source languages, including, for example, English. However, other languages such as Thai, Arabic, Telugu, Kannada, Malayalam, make heavy use of a variety of diacritics resulting in significant difficulties in text line detection, correct assignment of text lines, and assignment of diacritics to the correct line. To accurately recognize a source document, diacritics must be assigned correctly to the correct text line and not, for example, assigned to a line of their own. Various aspects of the present invention resolve at least some of the problems of detecting diacritics and assigning them to the correct text line.

Stated broadly, various aspects of the present invention are directed to identification and assignment of diacritics to a correct text box and/or text line. According to one aspect, accurate detection and assignment of diacritics enables OCR engines to appropriately process multiple language types and facilitates recognition of text and meaning from these multiple languages. If an OCR engine misidentifies or fails to accurately identify and assign diacritics, the accuracy of the recognition of the text can be compromised. Inaccurate recognition and assignment can result in errors on page division. Errors in page division can impact how imaged text is divided into blocks. Errors in text block identification can further result in cascading errors in OCR, including, for example, establishing improper paragraph boundaries within a source document.

Some conventional approaches attempt to identify and assign diacritics based on determining the proximity of a detected diacritic to the nearest ink (e.g., portion of a standard text character) from an identified body character. However, it is appreciated that such approaches suffer from errors in assignment and in some cases, result in errors in identification of diacritic characters. According to one embodiment, a system for diacritic detection and assignment is provided that includes an OCR engine that detects diacritic characters and base text characters and assigns the diacritics to base text and/or a text line responsive to a determination of multiple distance values. In one example, distance values are computed from a diacritic to a nearest base text box and from the diacritic to a nearest text line. The computed distance values are evaluated to determine optimal placement of a diacritic to detected characters and/or detected text lines within a source document or image. The methods and systems described result in a number of benefits, including higher accuracy and error reduction in generation of OCR output from source documents having diacritics.

According to one aspect, a computer-implemented method of processing diacritic marks in detected text using optical character recognition (OCR) is provided. The method comprises receiving, by a computer system, an electronic image containing text, the text including a plurality of diacritics, analyzing, by the computer system, the electronic image to generate a plurality of bounding blocks associated with text within the electronic image, wherein the plurality of bounding blocks include at least a base text bounding box and a diacritic bounding box, determining a base box distance between the diacritic bounding box and a nearest base text bounding box, analyzing the plurality of bounding blocks to determine a plurality of text lines, determining a proximity value for the diacritic bounding box to a nearest text line of the plurality of text lines, associating, by the computer system, the diacritic bounding box with a corresponding text line based on the proximity value and the base box distance, and processing the plurality of bounding blocks to produce electronic text from the electronic image.

According to one embodiment, the act of analyzing the plurality of bounding blocks to determine the plurality of text lines includes an act of generating a text line density map of the plurality of text lines. According to another embodiment, the method further comprises an act of determining a bulk text line value for at least one text line based on the text line density map. According to another embodiment, the act of determining the proximity value for the diacritic bounding box to the nearest text line of the plurality of text lines includes an act of determining the proximity value between the diacritic bounding box and the bulk text line value. According to another embodiment, associating the diacritic bounding box with the corresponding text line based on the proximity value and the base box distance includes an act of evaluating the proximity value and the base box distance for the diacritic to determine a shortest distance. According to another embodiment, the act of determining the proximity value for the diacritic bounding box to the nearest text line of the plurality of text lines includes determined proximity values for at least two proximate text lines to establish the nearest text line.

According to another embodiment, the method further comprises an act of assigning a weight to the proximity values determined for the at least two proximate text lines. According to another embodiment, the weight is configured to favor identification of downhill text lines over identification of uphill text lines as the nearest text line. According to another embodiment, the method further comprises an act of assigning a weight value to at least one of the base box distance and the proximity value based on predetermined parameters. According to another embodiment, the predetermined parameters include at least one of favoring assignment of the diacritic bounding box to a corresponding text line, wherein the corresponding text line is positioned below the diacritic, disfavoring assignment of the diacritic bounding box to the corresponding text line, wherein the corresponding text line is positioned above the diacritic, and determining weight values for one or more of the proximity value and the base box distance based on identification of a source language for the electronic image.

According to one aspect a system for processing diacritic marks in detected text using optical character recognition (OCR) is provided. The system comprises at least one processor operatively connected to a memory, the processor when executing is configured to provide an OCR engine, wherein the OCR engine is configured to receive an electronic image containing text including a plurality of diacritics, analyze the electronic image to generate a plurality of bounding blocks associated with text within the electronic image, wherein the plurality of bounding blocks include at least a base text bounding box and a diacritic bounding box, determine a base box distance between the diacritic bounding box and a nearest base text bounding box, analyze the plurality of bounding blocks to determine a plurality of text lines, determine a proximity value for the diacritic bounding box to a nearest text line of the plurality of text lines, associate the diacritic bounding box with a corresponding text line based on the proximity value and the base box distance, and process the plurality of bounding blocks to produce electronic text from the electronic image.

According to one embodiment, the OCR engine is further configured to generate a text line density map of the plurality of text lines to determine the plurality of text lines. According to another embodiment, the OCR engine is further configured to determine a bulk text line value for at least one text line based on the text line energy map. According to another embodiment, the OCR engine is further configured to determine the proximity value for the nearest text line between the diacritic bounding box and the bulk text line value. According to another embodiment, the OCR engine is further configured to evaluate the proximity value and the base box distance for the diacritic to determine a shortest distance in order to associate the diacritic bounding box with the corresponding text line based on the proximity value and the base block distance. According to another embodiment, the OCR engine is further configured to determine proximity values for at least two proximate text lines to establish the nearest text line.

According to another embodiment, the OCR engine is further configured to assign a weight to the proximity values determined for the at least two proximate text lines.

According to another embodiment, the weight is configured to favor identification of downhill text lines over identification of uphill text lines as the nearest text line. According to another embodiment, the OCR engine is further configured to assign a weight value to at least one of the base block distance and the proximity value based on predetermined parameters. According to another embodiment, the predetermined parameters include at least one of favoring assignment of the diacritic bounding box to a corresponding text line, wherein the corresponding text line is positioned below the diacritic, disfavoring assignment of the diacritic bounding box to the corresponding text line, wherein the corresponding text line is positioned above the diacritic, and determining weight values for one or more of the proximity value and the base box distance based on identification of a source language for the electronic image.

According to another aspect, a computer readable medium having stored thereon sequences of instruction for causing a computer to execute a method for assigning diacritics to a text line in detected text using optical character recognition (OCR) is provided. The method comprises receiving an electronic image containing text including a plurality of diacritics, analyzing the electronic image to generate a plurality of bounding blocks associated with text within the electronic image, wherein the plurality of bounding blocks include at least a base text bounding box and a diacritic bounding box, determining a base box distance between the diacritic bounding box and a nearest base text bounding box, analyzing the plurality of bounding blocks to determine a plurality of text lines, determining a proximity value for the diacritic bounding box to a nearest text line of the plurality of text lines, associating the diacritic bounding box with a corresponding text line based on the proximity value and the base box distance, and processing the plurality of bounding blocks to produce electronic text from the electronic image.

According to one embodiment, the act of analyzing the plurality of bounding blocks to determine the plurality of text lines includes an act of generating a text line density map of the plurality of text lines. According to another embodiment, the method further comprises an act of determining a bulk text line value for at least one text line based on the text line density map. According to another embodiment, the act of determining the proximity value for the diacritic bounding box to the nearest text line of the plurality of text lines includes an act of determining the proximity value between the diacritic bounding box and the bulk text line value. According to another embodiment, associating the diacritic bounding box with the corresponding text line based on the proximity value and the base box distance includes an act of evaluating the proximity value and the base box distance for the diacritic to determine a shortest distance. According to another embodiment, the act of determining the proximity value for the diacritic bounding box to the nearest text line of the plurality of text lines includes determined proximity values for at least two proximate text lines to establish the nearest text line.

According to another embodiment, the method further comprises an act of assigning a weight to the proximity values determined for the at least two proximate text lines. According to another embodiment, the weight is configured to favor identification of downhill text lines over identification of uphill text lines as the nearest text line. According to another embodiment, the method further comprises an act of assigning a weight value to at least one of the base box distance and the proximity value based on predetermined parameters. According to another embodiment, the predetermined parameters include at least one of favoring assignment of the diacritic bounding box to a corresponding text line, wherein the corresponding text line is positioned below the diacritic, disfavoring assignment of the diacritic bounding box to the corresponding text line, wherein the corresponding text line is positioned above the diacritic, and determining weight values for one or more of the proximity value and the base box distance based on identification of a source language for the electronic image.

Still other aspects, embodiments, and advantages of these exemplary aspects and embodiments, are discussed in detail below. Any embodiment disclosed herein may be combined with any other embodiment in any manner consistent with at least one of the objects, aims, and needs disclosed herein, and references to "an embodiment," "some embodiments," "an alternate embodiment," "various embodiments," "one embodiment" or the like are not necessarily mutually exclusive and are intended to indicate that a particular feature, structure, or characteristic described in connection with the embodiment may be included in at least one embodiment. The appearances of such terms herein are not necessarily all referring to the same embodiment. The accompanying drawings are included to provide illustration and a further understanding of the various aspects and embodiments, and are incorporated in and constitute a part of this specification. The drawings, together with the remainder of the specification, serve to explain principles and operations of the described and claimed aspects and embodiments.

BRIEF DESCRIPTION OF THE DRAWINGS

Various aspects of at least one embodiment are discussed below with reference to the accompanying figures, which are not intended to be drawn to scale. Where technical features in the figures, detailed description or any claim are followed by references signs, the reference signs have been included for the sole purpose of increasing the intelligibility of the figures, detailed description, and claims. Accordingly, neither the reference signs nor their absence are intended to have any limiting effect on the scope of any claim elements. In the figures, each identical or nearly identical component that is illustrated in various figures is represented by a like numeral. For purposes of clarity, not every component may be labeled in every figure. The figures are provided for the purposes of illustration and explanation and are not intended as a definition of the limits of the invention. In the figures:

DETAILED DESCRIPTION

Figure 1:
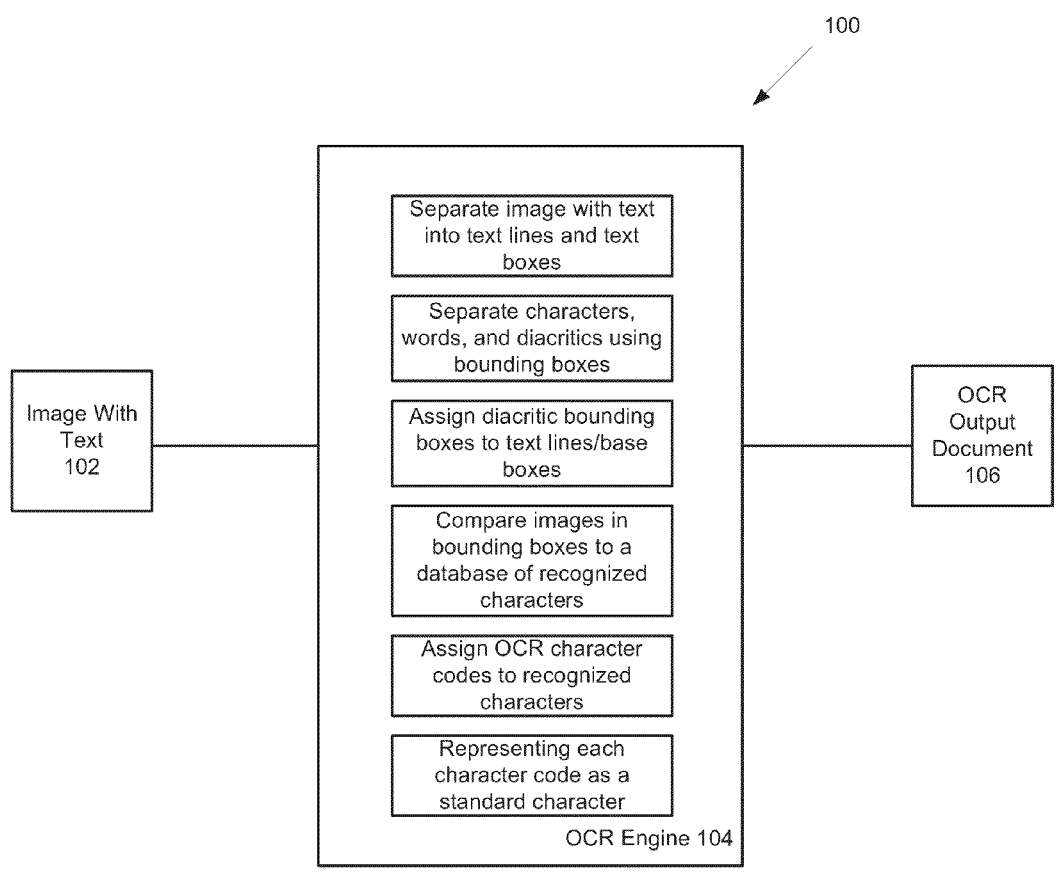
FIG. 1 is a diagram of a system for processing a scanned document using an Optical Character Recognition (OCR) engine.

As described above, traditional methods of parsing documents having diacritics either assign any detected diacritics to the most proximate "ink" or determine proximity to a nearest text line. Such assignments are often error prone, for example, where assignments based on proximity to the nearest ink can result in a diacritic assignment to a wrong text line. Also assignments based on line boundaries can fail because text lines may overlap depending on the source language for an OCR document. Accordingly, there is a need for a system and method of diacritic detection and assignment that is highly accurate and is able to quickly process a variety of source languages without failure to assign detected diacritics or errors in assignment.

According to one embodiment, a system is provided that includes an Optical Character Recognition (OCR) engine that receives an image. As an example, the image may be an image of a scanned document. As another example, the OCR engine may receive some other image including text, such as a photograph or video. The OCR engine analyzes the image to detect a plurality of bounding blocks and/or text lines associated with text within the imaged document. According to one embodiment, the plurality of bounding blocks encompass at least one diacritic bounding box and any number of base text boxes. In one embodiment, a text line density map can be generated from a plurality of bounding boxes to establish positions for a plurality of text lines within the imaged document. A text line density map correlates position within an image with the character or text density within respective regions of the image (e.g., the plurality of bounding blocks). For example, a text line can be defined by a function or distribution that bounds a region of an imaged document wherein text and its location within the region is used to define the function for establishing a text line boundary. Each defined text line can have a position within an image and be associated with a measurement of the density of the text characters within the text line to establish the text line density map.

In one example, a Gaussian distribution of detected text in a region can be used to establish placement of individual text lines within the imaged document. Within any image, a position and text character density for any detected text line can be mapped establishing a text line density map for that image. The text line density map can then be used to calculate a nearest text line from, for example, diacritics detected within a source image.

In another example, rectangular blurring can be executed by an OCR engine to generate a text line density map for a source image. In one embodiment, rectangular blurring defines text lines based on identification of text bounding boxes for text characters in a source image. Once the OCR engine identifies text bounding boxes and any connections between them, the OCR engine can be configured to blur or spread the areas of the connected text bounding boxes outward to define a text line boundary. Within the text line boundary pixels associated with text characters are counted and used to measure text density for the text line. According to one embodiment, the positions of the text lines and their associated text density in the image generate a density map which can be used by the OCR engine to determine and/or weight a proximity value between a diacritic bounding box and a nearest text line.

Text line detection may also proceed in others ways. In one embodiment, pixels or groups of pixels within an image are evaluated to determine an energy value associated with each pixels or groups of pixels, with low energy values assigned to white space and higher energy values assigned to text. The energy values in the image can then be evaluated based on the respective energy values assigned, including the values assigned to detected text, and text lines can be separated and/or defined by the energy values within a region of the image. For example, a text line can be defined by determining local minima within the energy map that pass through text components on a text line. According to some embodiments, the definition of text lines and/or a plurality of text bounding blocks can occur before, after, and/or in conjunction with the definition of text bounding boxes (e.g., base bounding boxes and diacritic bounding boxes).

A text line density map can also be used to define the distributions of any established text lines in a source image. The text line density map can further be used to analyze the positioning of any detected diacritic bounding box within the imaged document to determine a proximity value between the diacritic bounding box and a nearest text line. In conjunction with the text line proximity value, the OCR system can also compute a proximity value from any diacritic bounding box to its nearest base bounding box. Where the two proximity values are determined by the OCR system to agree and/or are valid, the diacritic bounding box can be associated with a proximate line and base text box. Where the proximity values disagree, weighting on the determined proximity values can be used to resolve assignment to a correct text line. In some embodiments, weightings are incorporated into the determination of the proximity values and identification of a "nearest" value or smallest distance value computed from nearest ink and nearest line is used to assign the diacritic to the correct text line.

In some embodiments, weightings can be assigned based on evaluations of where a diacritic normally or frequently appears. Frequently, diacritics are positioned above an identified text line and can be weighted accordingly in some embodiments. In other embodiments, weightings of proximity values can be made dependant on a source language, and the weightings can be assigned to favor placement of a diacritic above or below a text line responsive to identification of the source language.

Figure 7:
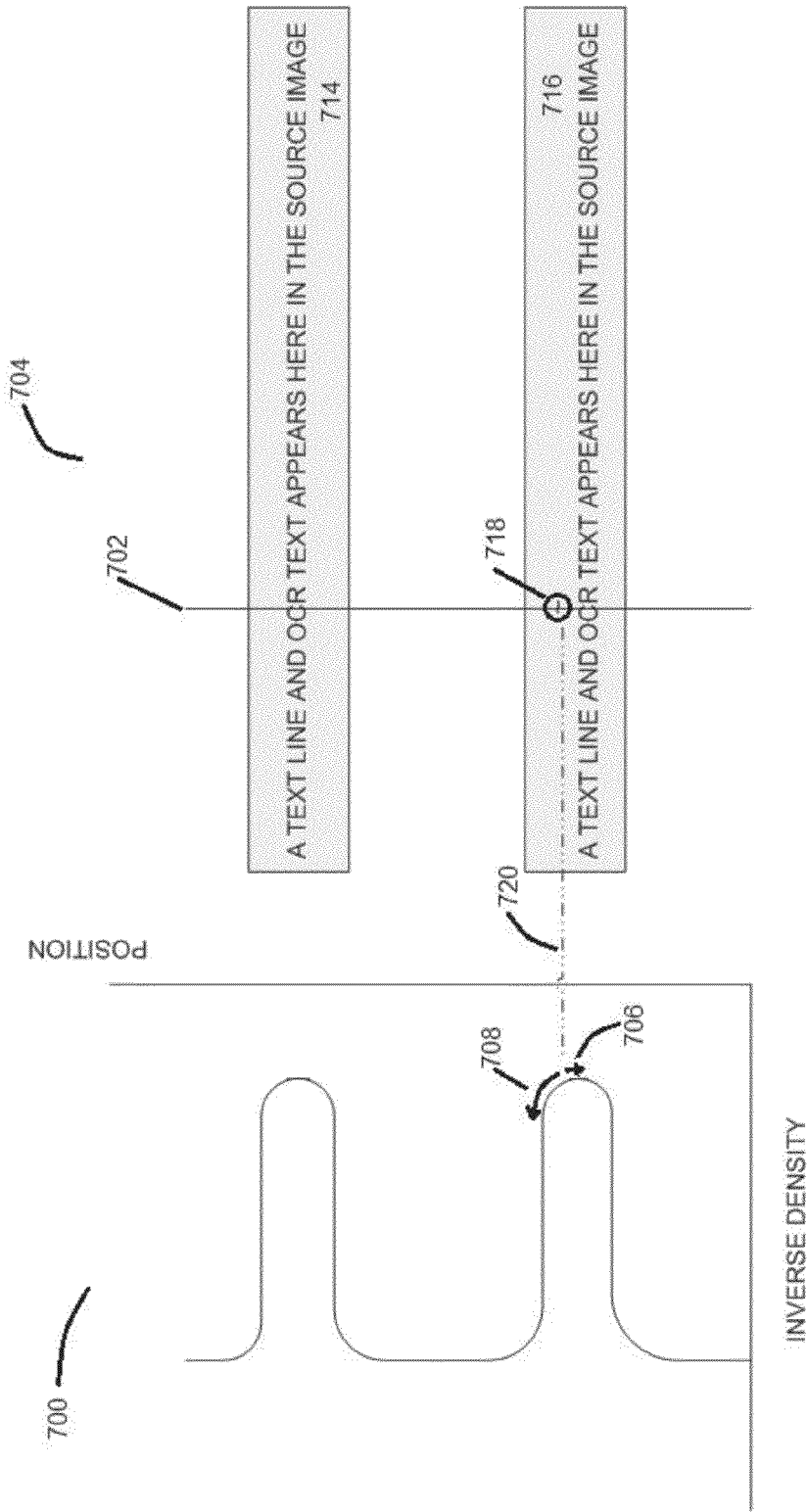
FIG. 7 is an example graph of text line density for a portion of a text line density map of detected text lines in a source image, according to one embodiment.

Shown in FIG. 7 is an example graph 700 of text line density for a vertical slice 702 taken from a text line density map of two detected text lines in a source image 704. The example density graph 700 plots an inverse density measure for the detected text lines (e.g., 714 and 716) in the source image taken along slice 702. In some implementations, downhill and uphill weightings of distances are defined based on the text density distributions associated with a text line density map of a source document. For example, in weighting nearest text line proximity values, proximity values that result in selection of a "downhill" text line assign a position of a diacritic can be heavily weighted. Downhill distances are illustrated, for example, by arrow 706 in graph 700 relative to a position of a detected diacritic 718 and its corresponding position on the graph shown by dashed line 720. Uphill distances are illustrated at 708.

More generally, according to some embodiments uphill distances can be defined and weighted based on a number of pixel steps taken to reach a text line position, for example, in a density map, where the movement to the next pixel results in an increase in the text density value. Downhill distances can be defined and weighted based on a number of pixel steps taken to reach a text line position, for example, in a density map, where the movement to the next pixel results in a decrease in the text density value. Definition of uphill and downhill and respective increases and decreases in density values depends on whether an inverse density measure is being employed. For inverse density measures, low density values reflect text lines and high density values reflect whitespace. (e.g., as shown in inverse density graph 700).

Using a direct text density measurement, the definitions of uphill and downhill change accordingly. When measuring text density directly higher density values reflect text line positions and lower density values reflect whitespace. Thus, downhill distances for direct density measurements are identified when a pixel step in an image results in an increase in the density value, and uphill distances are identified when a pixel step in the image results in a decrease in the density value.

In some examples, the distances being evaluated result in no change in density. In some embodiments, these level/horizontal distances can be given no weightings or weighting factors of 1, effectively producing no change in a measured pixel or other distance measure. According to some embodiments, the weights applied to the proximity values can be changed according to the source language to favor attraction to the top or bottom of a text line.

Referring to FIG. 1, there is illustrated one example of a system 100 for processing a scanned or imaged document using an OCR engine 104. An image 102, which, for example, may be scanned or imaged from a book or another publication, is received by the OCR engine 104. Elements of the system 100 can be provided using a computing system such as the computer system 600 described with reference to FIG. 6.

According to various examples, the OCR engine 104 can separate an imaged document into a plurality of text lines. The text lines can be established using a plurality of rectangular bounding boxes intended to enclose the text written on each page. The OCR engine can be configured to connect the text components within each bounding box and/or the text bounding boxes to form a text line. The OCR engine can then draw a text bounding block around the identified text line.

The OCR engine can also generate bounding boxes which normally encloses one or more connected groups of text pixels of one character or word perceived by the OCR engine. The words may be further separated into characters using bounding boxes using different types of methods. The imaged text on each page of the source document can also include diacritics, and the corresponding bounding boxes can be defined on base text characters separately from the diacritic characters. Base text characters are the standard characters used in a source language which can be modified by the appearance of the diacritic characters.

The OCR engine can be configured to construct text line blocks from connected text bounding boxes. Each one of a group of connected text bounding boxes can be spread and the overlapping area used to establish a text line block. In one embodiment, each text bounding box area is increased either horizontally or vertically depending on the orientation of the connected text bounding boxes (and thus the text line). According to one embodiment, each of boxes can be expanded up to 8 times a bounding box's height for a horizontally oriented text line and 8 times a bounding box's width for vertically oriented text line. In other embodiments, different expansion multipliers can be used by the OCR engine.

In some implementations, a line orientation may not be readily identified, if the bounding box has a connected component to its left or right the bounding box can be spread or blurred horizontally by 2 times its height and if the component has a connected component above or below, the bounding box can be spread vertically by 2 times its width. In other embodiments, different expansion multipliers can be used by the OCR engine to construct text line blocks. In some examples, the spread or blurred text line blocks can be truncated by the OCR engine at each edge. Where the blurred boundary extends pass a column boundary, page boundary, or into whitespace, for example, the edges of the text line block can be truncated.

According to one embodiment, the density map is the resulting image generated by the OCR engine that contains the connected text components that cover each pixel when spread or blurred as discussed.

In some embodiments, when the image has grayscale or color information, the OCR engine classifies the image in a binary manner so that each image pixel is determined to be either a foreground pixel (e.g., black text) or a background pixel (e.g., a white region). The classified image can then be processed to establish bounding boxes and/or text lines. According to one embodiment, text lines can be defined from the plurality of bounding boxes. A text line density map for an imaged document can establish the positioning of the text lines and their associated character density at their respective position within any imaged document. The density of the text and/or text boxes within a region in an image can also be used to identify text lines and map their position within the image.

In one example, a density measure can be determined by counting a number of pixels associated with text characters in a region of a source image and dividing the number of text pixels by the total number of text pixels in the region. Other approaches for determining text line density can be employed, including for example, determining distributions of text characters within regions of an image or counting only text pixels for a region.

In another example, a seam carving approach can establish an energy map for text lines within an imaged document where each seam or line is drawn through imaged text by following local energy minima where the seam passes through the detected text along a text line. In some instances, the minimum energy paths can also find the white space between text lines and provide the positioning of the text lines accordingly.

In some embodiments, individual text lines can also be established from a source image where the image is first smoothed, for example, using a Gaussian filter bank. Text lines can be extracted from the smoothed imaged using a number of techniques, including for example, ridge line detection, heuristic approaches, and/or adaptive learning approaches. Once the positioning of the text lines has been established, the positioning of the text lines can be compared to the positioning of a diacritic bounding box. The OCR engine can determine a nearest resulting distance in response to comparing the distance from the diacritic bounding box to the nearest text line against a determination of the distance from the diacritic bounding box to its nearest base text. In some embodiments, the OCR engine is configured to determine a distance from a diacritic bounding box to a nearest ink position or nearest base text using a variety of functions. Any of the known positioning approaches can be used to establish a distance value for the nearest ink position.

In some embodiments, the OCR engine 104 may assign to each bounding box (e.g. base, diacritic, or combination of base and diacritic bounding boxes) one or more OCR character codes. Each OCR character code identifies one or more characters, text characters, and/or diacritics that the engine has recognized in a bounding box. If the OCR engine 104 fails to recognize any character in a bounding box, the OCR engine may assign no OCR character code to the bounding box and other post-processing methods can be used to process these characters. Each character identified by the OCR character code can be represented as a standard character, for example, encoded as an ASCII or a Unicode encoded character. Using the character codes and the represented characters, the OCR engine 104 produces an output document 106 which represents the imaged document in standard character form.

In other embodiments, each bounding box can be thought of as a clipping path that isolates a portion or small image of the document image, whether in an original, smoothed, or a classified binary form. Because these small images can be thought of as being "clipped" from the document image by their respective bounding boxes, these small images can be referred to as "clips" or "clip images." Because each clip image may be tied to a bounding box, the OCR character code or codes, and hence the character or characters, assigned to a bounding box can also be referred to or identified as the codes or the characters assigned to the clip image.

As described above, the OCR engine (e.g., OCR engine 104) can be used to detect and process diacritics and assign the diacritic to a determined text line by evaluating a nearest ink proximity value and a nearest text line proximity value.

Figure 2:
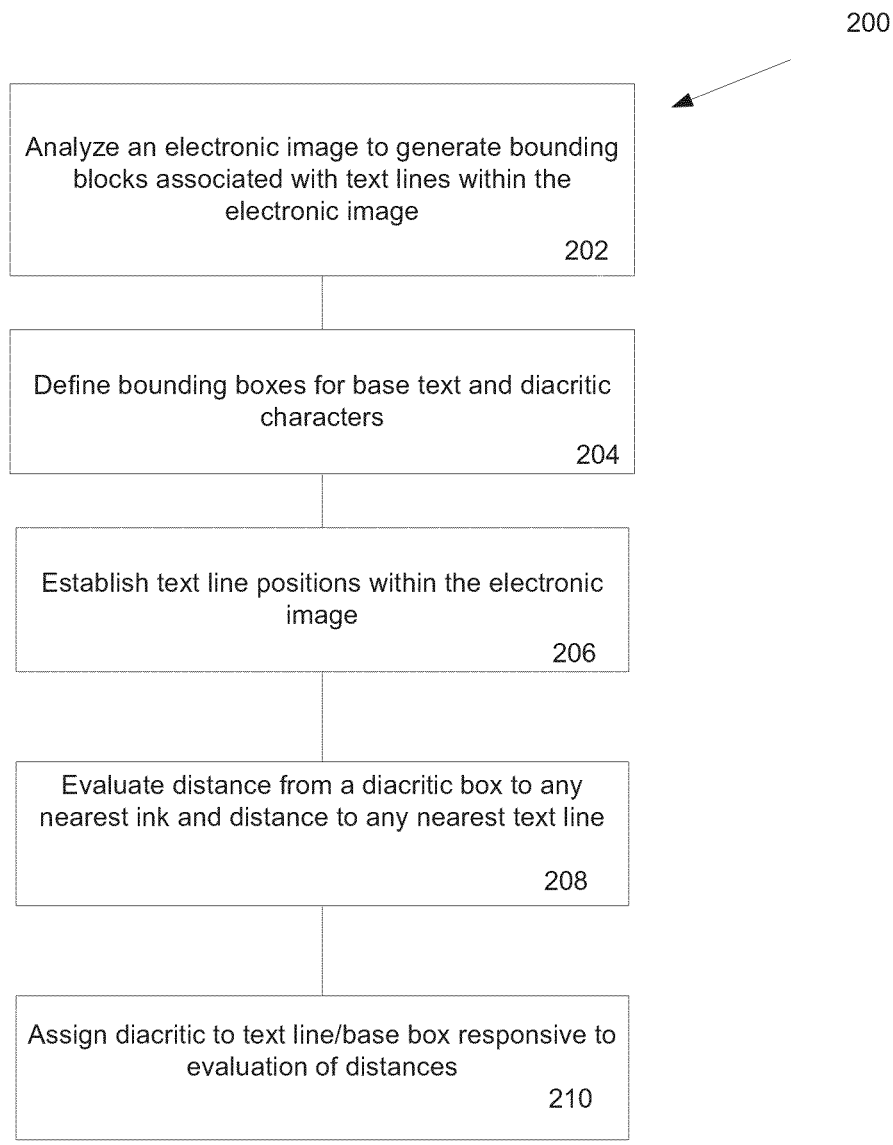
FIG. 2 is an example process flow for a method of assigning diacritics to a text line identified in an image containing text, according to one embodiment.

FIG. 2 shows one example of a method 200 of assigning diacritics to a text line identified in an image containing text which can be executed by the computer systems described below with reference to FIG. 6. The method 200 includes steps of generating text line bounding blocks from a source image having text and diacritic characters, generating a plurality of text lines for the text detected in the source image, determining proximity values between a diacritic and its nearest ink and the diacritic and its nearest text line, and assigning the diacritic to the appropriate text line responsive to evaluating the proximity values.

In step 202, the OCR engine analyzes a source image captured, for example, from a scan of a document to generate bounding blocks and/or bounding boxes associated with a plurality of text lines in the imaged document. Bounding boxes within the text can also be generated for base text and diacritics at 204. In one example, text characters detected in the imaged document are separated into constituent components. Diacritics components can be distinguished and isolated from a base portion of the character using variety of known methods. For example, segmentation processes can be executed against the imaged document to separate diacritics from base characters, and bounding boxes can be defined for each (e.g., 502, diacritic bounding box, FIGS. 5 and 504, base bounding box). Other known processes can be used to identify base bounding boxes and diacritic bounding boxes, including for example carving or clipping processes for separating detected text into base components and diacritic components, so that the diacritic bounding box can be assigned to a correct text line.

Process 200 continues with establishing positions of text lines within the electronic image at 206. Detecting text lines may be accomplished through any number of methods currently known. For example, one method of text line detection includes processing of horizontal or vertical chains of connected clip images or bounding boxes. In this method, according to one example, nearby horizontal chains are joined into text lines provided that the joined chains do not go across column boundaries or introduce additional vertical overlap of the text lines. This method may maximize the width of the text line while minimizing vertical overlap between the text lines.

In another example, text lines can be detected based on an energy map of the imaged document. Text lines can be detected within the energy map by determining regions that pass through text components by following local energy minima on the energy map. In one embodiment, an image containing text can be evaluated based on energy values assigned to detected text, and text lines can be separated and/or defined by energy values within a region of the images. For example, a text line can be defined by determining local minima within the energy map that pass through text components on a text line. According to some embodiments, candidate diacritic characters for text line assignment are identified as the diacritic characters that do not form part of a text line determined at 206, and can also be characterized by a small area relative to the area of typical objects in a text line.

In a further example, a text line density map can be generated from the connected text components identified in the imaged document. According to one embodiment, the density map can be generated to establish positions and text density of the text lines appearing in the imaged document by expanding the bounding boxes associated with detected text components. The text line density map can establish text line boundaries within an electronic image based on the text characters appearing within analyzed regions. Density can be measured based on the concentration of text characters within an area or region of the imaged document. In some embodiments, the density measurements can be inverted so that text lines are assigned small density values with whitespace having high density values, and the inverted densities mapped against location in an imaged document.

In another example, ridge detection can also be employed to identify text lines within an electronic image. Other heuristic and/or adaptive learning approaches can also be executed to identify and establish text line positions in an electronic image. According to some embodiments, the definition of text lines and position at 206 can occur before, after, and/or in conjunction with the definition of text bounding boxes 202-204 (e.g., base bounding boxes and diacritic bounding boxes at 204). In other embodiments, steps 202-206 can be collapsed into one execution with the identification of text bounding boxes and text lines occurring together.

Having established positions for diacritics in the electronic image and positions for text lines, process 200 continues with evaluating those positions from a diacritic to its nearest ink (e.g., character in a base bounding box, base bounding box, cut-out of a base bounding box, etc.) and from the diacritic to a nearest text line at 208. In some embodiments, determining proximity to a nearest ink or base text character can be trivial. In some examples, the determination of distance can be made using the dimensions of the bounding box surrounding the diacritic. In other examples, the determination of distance can be made based on the closest portion of the diacritic character to a closest portion of a base text character. In yet others, distance for nearest ink can be determined from the closest portion of the diacritic character to a closest portion of a base text bounding box. In another embodiment, a connected-component approach can be employed.

Figure 8:
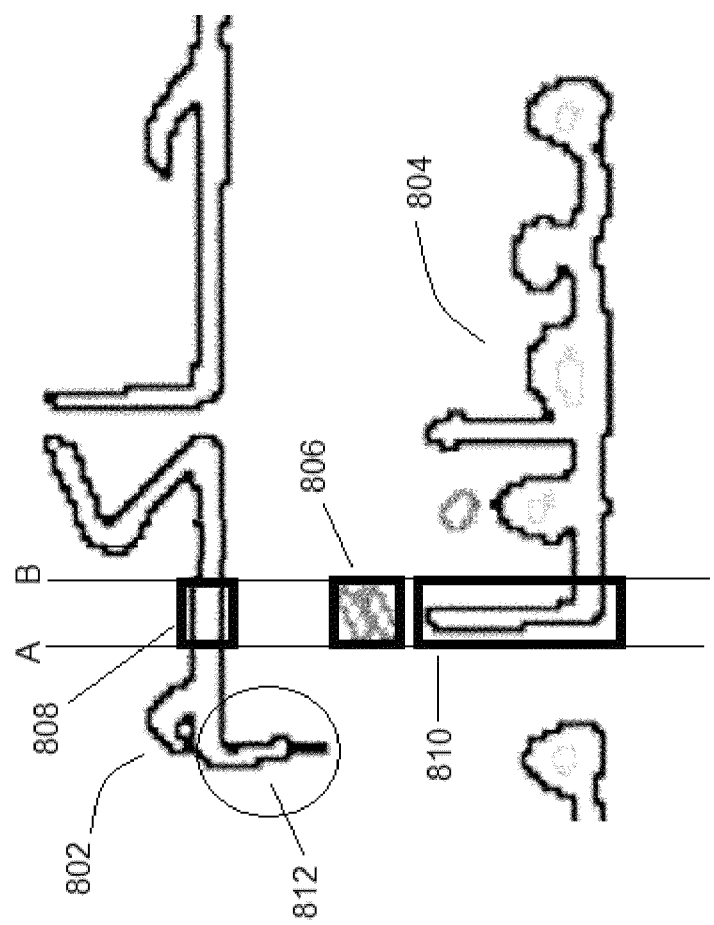
FIG. 8 illustrates bounding boxes drawn around diacritic and base text to determine a nearest ink distance, according to one embodiment.

In one example of a connected-component approach, given a candidate diacritic bounding box, proximate candidate base character bounding boxes are cut parallel to the sides of the candidate diacritic bounding box, then the bounding boxes defined by the cut-out portions of the candidate base character bounding boxes are computed and evaluated to determine a nearest distance to the diacritic. FIG. 8 illustrates an example connected-component approach to determining nearest ink. Base text at 802 and 804 is evaluated to determine which base character is closest to diacritic 806. In the connected-component approach, a cut-out of the base character bounding boxes are made to define cut-out bounding boxes at 808 and 810. In one example, the cut-out bounding boxes are drawn parallel to the sides of the diacritic bounding box 806 (shown by lines A and B) to define 808 and 810. Using cut-out bounding boxes can improve determination of nearest ink by excluding portions of base text that may skew distance determinations (e.g., 812). Determination of the distances between the cut-out bounding boxes and the diacritic bounding boxes can proceed by evaluating their respective positions in the image.

In some embodiments, step 208 continues by identifying a closest portion of the diacritic or diacritic bounding block to a nearest text line and determining the representative distance. In some embodiments, the position of each text line can be represented generally as a position based on the bulk of the text line. For example, text lines identified at 206 as regions within the electronic image can be represented as a block or line to simplify the determination of distance to the nearest diacritic.

In some embodiments, a bulk of text line can be defined using the component bounding boxes of detected text within the text line. For example, where text lines are determined by connecting text components into chains that form text lines, the bulk of the text line can be defined by the region between the median position of the tops of each of the component bounding boxes within the text line and the median position of the bottoms of each of the component bounding boxes.

In other embodiments, distance from a diacritic to a nearest text line can be determined to a nearest line boundary (e.g., the bulk of the text line). For example, lines detected using ridge processing have upper boundaries defined by an x-line and lower boundaries defined by a base line. Distance to a diacritic can be measured from either, based on the positioning of the diacritic with respect to the line. In other embodiments, a distance can be determined from proximity to a seam identified in an energy map of the electronic image.

Distances from diacritics to nearest ink and nearest text lines can be weighted, according to some embodiments. For example, distances from a nearest text line to a diacritic can be weighted to favor identification of the nearest text line that is downhill from the diacritic in an inverse density distribution, as shown, for example, in FIG. 7. In another example, distances from a nearest text line to a diacritic can be weighted to disfavor identification of the nearest text line that is uphill from the diacritic according to the inverse density distribution shown, for example, in FIG. 7. Nearest ink distance can also be weighted in some examples. However, in some embodiments nearest ink distances receive no weightings.

At 210 the diacritic is assigned to a text line and/or base text box responsive to an evaluation of determined distances. The diacritic is assigned to the text line and/or a base text box within the text line having the shortest distance to either the nearest ink or nearest text line determined in 208.

According to some embodiments, determinations of text lines and generation of bounding boxes (e.g., diacritic bounding box and base bounding box) can be assisted by further processing and identification of the bounded characters to identify predefined character groups. For example, character groups may include a standard character group, a diacritic character group, etc. The character groups may further include a rendering character group(s) which identifies italics or other fonts and may include any characters rendered in a non-standard font. Symbols, diacritics, or characters with low recognition confidence can be categorized into an unknown character group. It is appreciated that different character groups may be defined including different combinations of characters.

In one embodiment, to detect different character groups, the OCR engine can execute training processes to first analyze one or more training sample documents. One example of a training sample document may include a combination of standard characters, diacritics, and font families, which allows the OCR engine to produce a training data set of characters or classifiers that the OCR engine can later use as a basis of comparison. In one example, the OCR engine may be configured to analyze two training samples. The OCR engine may analyze a first training sample that may include standard characters and diacritics and a second training sample that may include standard characters, both of which may include characters of multiple font families including italic characters and diacritic characters. Each character that is accurately detected is added to one or more classifiers as training data to generate an adaptive classifier for each recognized character.

Recognition of standard character groups can assist in establishing a plurality of bounding boxes for text in an electronic image as well as assist in the identification and positioning of text lines or text bounding blocks within the electronic image.

Figure 3:
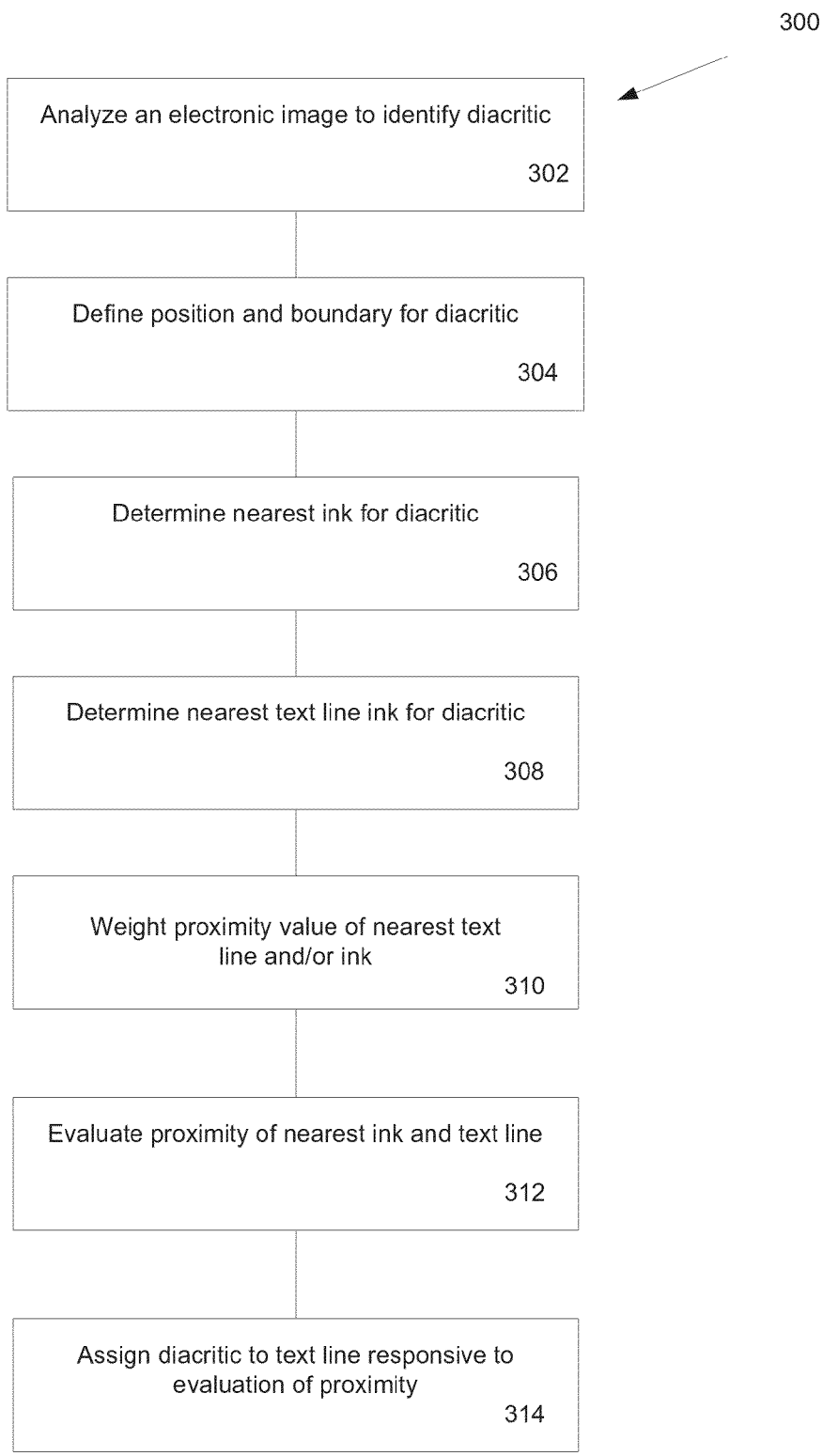
FIG. 3 is an example process flow for a method of assigning diacritics to a text line, according to one embodiment.

Shown in FIG. 3 is an example process flow for a method of assigning diacritics to a text line according to one embodiment which can be executed, for example, by the computer systems described below with reference to FIG. 6. Process 300 beings at 302 with analysis of an electronic image to identify diacritics within imaged text. In one example, candidate diacritic bounding boxes can be identified during text component analysis and generation of a plurality of text bounding boxes.

In one embodiment, an OCR engine can generate a plurality of bounding boxes, which normally enclose one or more connected groups of text pixels of one character or word perceived by the OCR engine. The words may be further separated into characters using bounding boxes according to different types of methods. The imaged text on each page of a source document can also include diacritics, and the corresponding bounding boxes can be defined on base text characters separately from the diacritic characters. Base text characters are the standard characters used in a source language which can be modified by the appearance of the diacritic characters.

During text component analysis candidate text lines can also be defined by connecting text components from the plurality of text bounding boxes into text lines so long as the connected components do not go across column boundaries or introduce additional vertical overlap of the text lines. In one example, candidate text lines are defined starting from a text bounding box drawn around a character or group of characters, and a connected component is detected by identifying the nearest overlapping text component by moving outward from each of the four sides of the text bounding box. In some embodiments, a best and nearest overlapping text component is identified by determining the nearest text component of a similar size to the comparison text bounding box. A text block boundary can then be drawn around the connected components. In many source images diacritic components may not be included in an initial text block boundary. Thus, these candidate diacritic components need to be assigned to an appropriate text line.

At 304 the position and/or boundary for the diacritic is defined and the nearest ink to the diacritic can be determined at 306. A process for finding a nearest base character or portion of a nearest base character can be executed to determine the nearest ink at 306. In one example, a nearest ink is identified by first establishing a cut-out portion of at least two proximate base text boxes. Referring again to FIG. 8, illustrated are operations performed during an example process for nearest ink identification. Base text at 802 and 804 is evaluated to determine which base character is closest to diacritic 806. Proximate portions of the proximate base characters are established by extending parallel lines from each side boundary of the diacritic being evaluated. The resulting cut-out bounding boxes are illustrated at 808 and 810. Determining distance to the cut-out bounding boxes 808 and 801 can improve determination of nearest ink by excluding portions of base text that may skew distance determinations (e.g., 812). In one example, determination of the distances between the cut-out bounding boxes and the diacritic bounding boxes can proceed by evaluating the distance between the boundaries of the cut-out bounding boxes 808-810 and the diacritic bounding box 806. One should appreciate that other approaches for identifying a nearest character or ink can be employed to determine the nearest ink distance for a diacritic, for example as part of 306. Further, in some embodiments, various sub-processes for determining nearest ink can be executed as part of 306.

Process 300 continues at 308 by determining a distance from the diacritic to a nearest text line. In some embodiments, the distance can be measured against both text lines that are proximate to the diacritic in order to determine the nearest text line and the shortest associated distance. In some embodiments, a position for each text line can be determined from a region defined for an identified text line. For example, a bulk of the text line can be defined based on the placement of the text characters appearing within the line and the respective bounding boxes surrounding the text characters.

Figure 9:
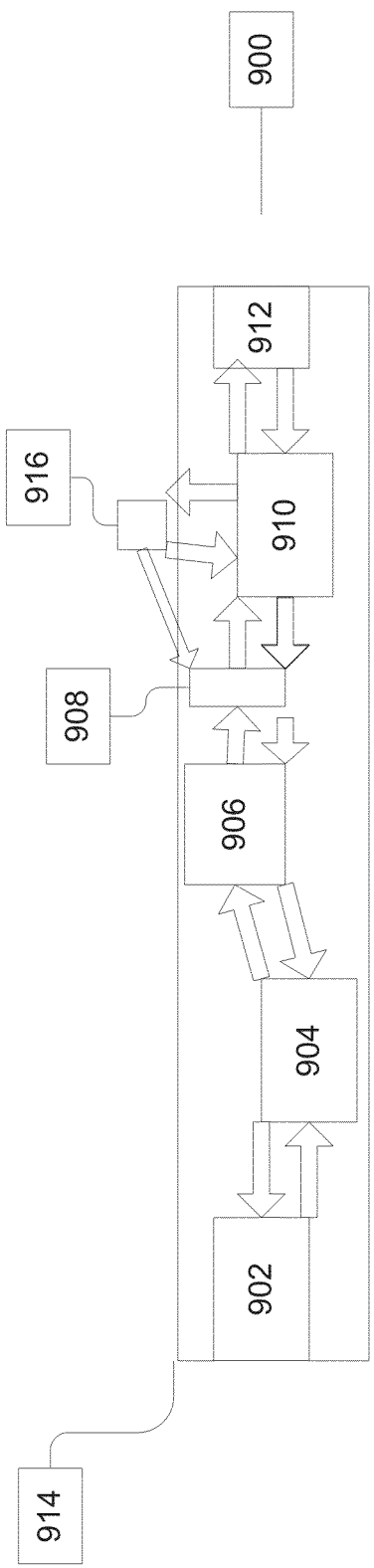
FIG. 9 illustrates an example of text line detection, according to one embodiment.

In another example, initial text line positions are determined from chaining together groups of text bounding boxes drawn around a character or group of characters. FIG. 9 illustrates an example of a detected text line 900. In one embodiment, an initial text bounding box can be used to discover a connected text component by moving outward from each of the four sides of the text bounding box. In some embodiments, a best and nearest overlapping text component is identified by determining the nearest text component of a similar size to the comparison text bounding box and adding the component to the chain if the best and nearest component determination is mutual (e.g., from 902 to 904 and 904 to 902). Detection proceeds from each box, establishing, for example, mutual connections (e.g., 902-904, 904-906, etc.) until the joined chains of text bounding boxes cross column boundaries or introduce additional vertical overlap of the defined text lines. A text block boundary 914 can then be drawn around the connected components establishing the position of the text line for distance analysis. Shown in FIG. 9, is an example of connected text components 902-912 that form a chain of mutual partnership to identify the text line bounding block 914 within a source image. Diacritic 916 falls outside of the initial text line boundary, and will be assigned by determining the smallest distance of either the distance from the diacritic to its nearest ink or the distance from the diacritic to its nearest text line.

Once the position of the text lines in an image are established, distances can be measured to establish the distance from a diacritic to a nearest text line or a nearest portion of the nearest text line. In another example, the distance to a nearest text line is determined from a position defined by the "bulk" of an identified text line. According to one embodiment, the bulk of the text line is defined by the region between the median position of the tops of each of the component text bounding boxes within the text line and the median position of the bottoms of each of the component bounding boxes within the text line. Distance from the diacritic to the bulk of the text line can then be used to determine a proximity value for a nearest text line.

The distances determined for nearest ink and nearest text line can be weighted to establish comparison distances at 310. In some embodiments, the weighting can be defined responsive to an identification of a source language for an electronic image. In English almost all diacritics would appear above a given text line, and therefore downhill distances from a diacritic to a text line can be heavily weighted, as much as 5 times over a nearest ink calculation and/or an uphill distance. Other source languages can trigger different weightings for uphill vs. downhill distances.

According to one embodiment, downhill and uphill weightings of distances are defined based on the density distributions associated with a text line density map of a source document. In one example, uphill distances can be defined and weighted based on a number of pixel steps taken to reach a text line position in a density map, where the movement to the next pixel results in an increase in the density value according to some embodiments relative to a mapping of inverse densities. Downhill distances can be defined and weighted based on a number of pixel steps taken to reach a text line position in a density map, where the movement to the next pixel results in a decrease in the density value according to some embodiments. According to one embodiment, downhill distances are given a weighting of 0.25 units, favoring the downhill distance 4 times over an un-weighted distance. According to another embodiment, uphill distances are given a weighting of 4 units, disfavoring the uphill distance 4 times over an un-weighted distance. In some embodiments, evaluated distances result in little or no change in density and are given no weighting. In some examples, weighting can be employed with downhill distance or uphill distance or the combination of both.

Weighted or un-weighted distances can be evaluated at 312 to determine a text line and/or a base bounding block to assign to diacritic at 314.

Figure 4:
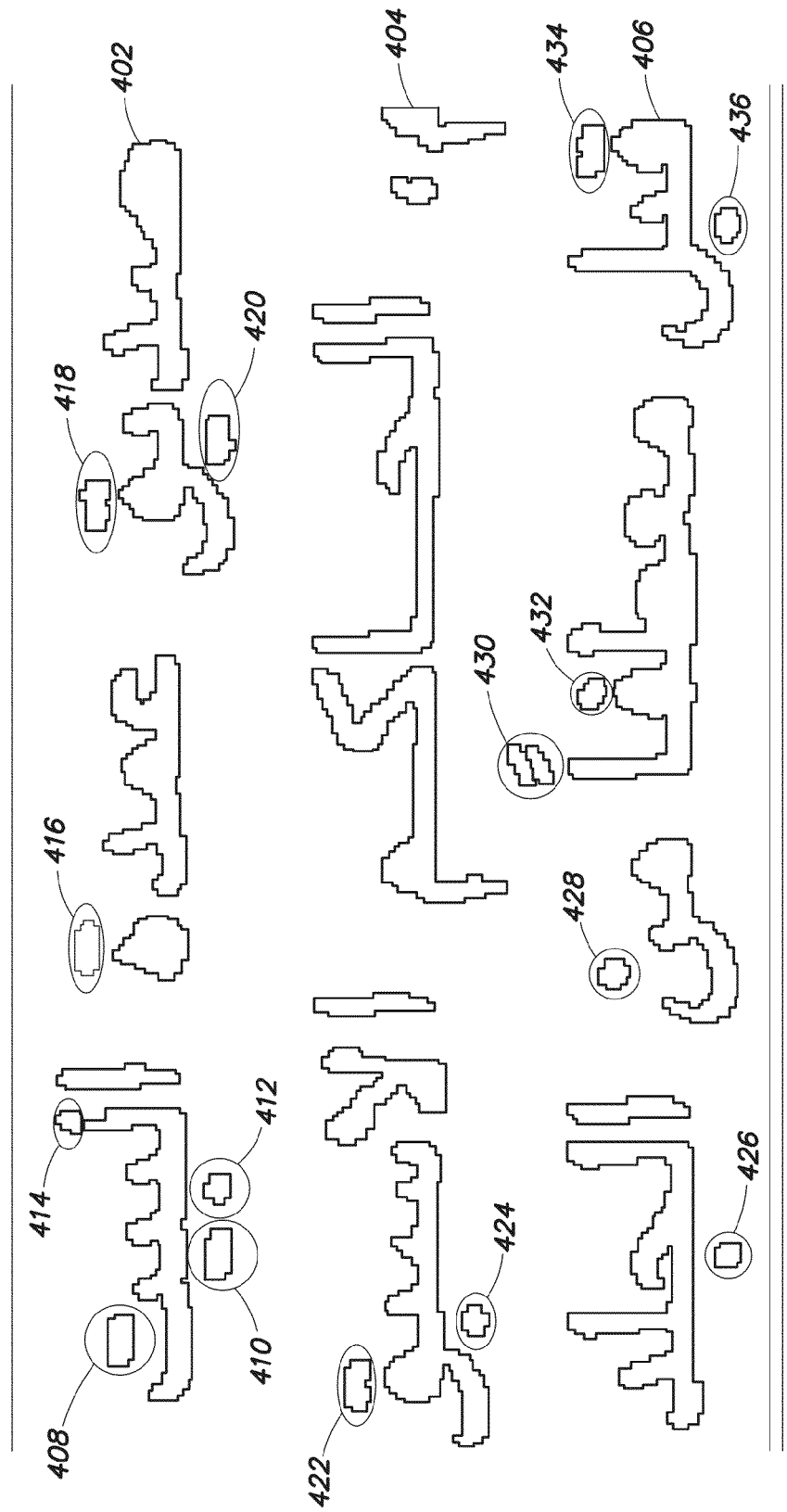
FIG. 4. is a diagram of source text with diacritics, according to one embodiment.
Figure 5:
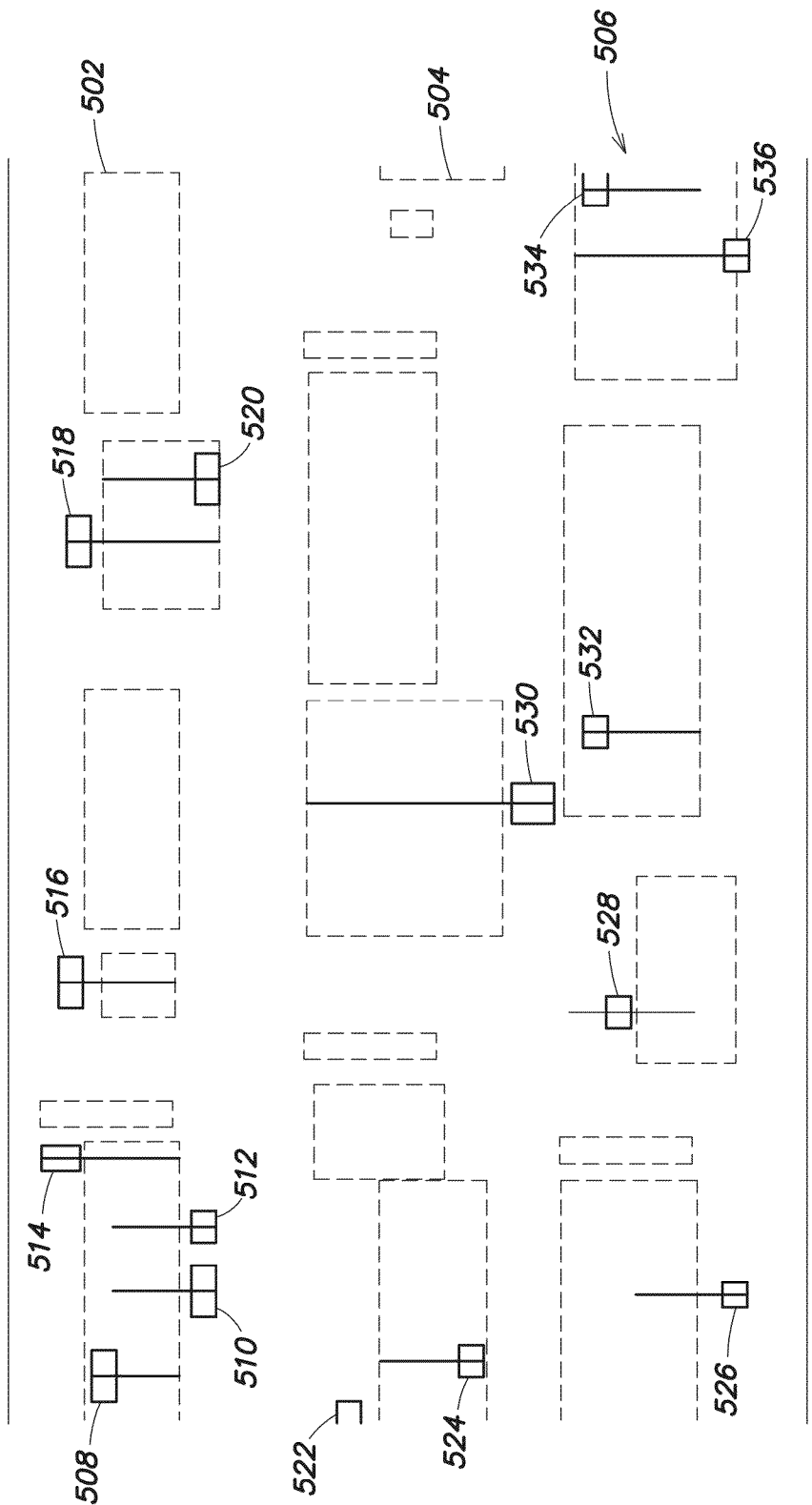
FIG. 5 is a diagram of resulting bounding boxes generated from OCR processing of the source text image.

FIG. 4 shows an example of an imaged text source including diacritics. Shown in FIG. 4 is three lines of Arabic text 402, 404, and 406, with associated diacritics appearing at 408-436. The processed image is shown in FIG. 5. A plurality of bounding boxes have been generated from the three texts lines at 502, 504, and 506. Diacritic bounding blocks shown in solid line at 508-536 correspond to the diacritics shown in FIG. 4 at 408-436. Illustrated in dashed line in FIG. 5 are the base text bounding blocks corresponding to the source text in FIG. 4.

Example Computer Implementations

Various aspects and functions described herein, in accord with aspects of the present invention, may be implemented as hardware, software, or a combination of hardware and software on one or more computer systems. There are many examples of computer systems currently in use. Some examples include, among others, network appliances, personal computers, workstations, mainframes, networked clients, servers, media servers, application servers, database servers, web servers, and virtual servers. Other examples of computer systems may include mobile computing devices, such as cellular phones and personal digital assistants, and network equipment, such as load balancers, routers and switches. Additionally, aspects in accord with the present invention may be located on a single computer system or may be distributed among one or more computer systems connected to one or more communication networks.

For example, various aspects and functions may be distributed among one or more computer systems configured to provide a service to one or more client computers, or to perform an overall task as part of a distributed system. Additionally, aspects may be performed on a client-server or multi-tier system that includes components distributed among one or more server systems that perform various functions. Thus, the invention is not limited to executing on any particular system or group of systems. Further, aspects may be implemented in software, hardware or firmware, or any combination thereof. Thus, aspects in accord with the present invention may be implemented within methods, acts, systems, system placements and components using a variety of hardware and software configurations, and the implementation is not limited to any particular distributed architecture, network, or communication protocol. Furthermore, aspects in accord with the present invention may be implemented as specially-programmed hardware and/or software.

Figure 6:
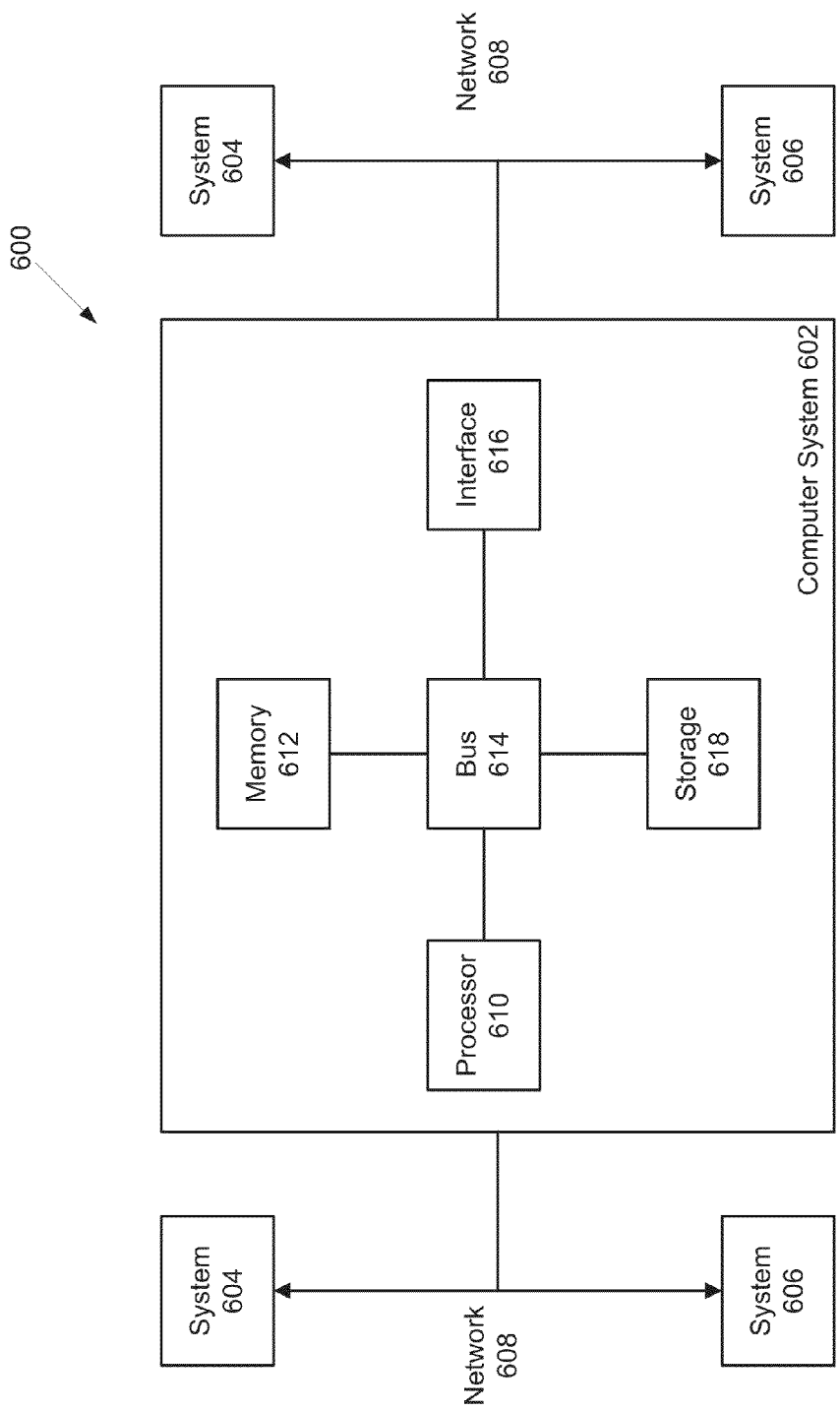
FIG. 6 is a block diagram of one example of a computer system that may be used to perform processes and functions disclosed herein.

FIG. 6 shows a block diagram of a distributed computer system 600, in which various aspects and functions in accord with the present invention may be practiced. The distributed computer system 600 may include one more computer systems. For example, as illustrated, the distributed computer system 600 includes three computer systems 602, 604 and 606. As shown, the computer systems 602, 604 and 606 are interconnected by, and may exchange data through, a communication network 608. The network 608 may include any communication network through which computer systems may exchange data. To exchange data via the network 608, the computer systems 602, 604, and 606 and the network 608 may use various methods, protocols and standards including, among others, token ring, Ethernet, Wireless Ethernet, Bluetooth, TCP/IP, UDP, HTTP, FTP, SNMP, SMS, MMS, SS7, JSON, XML, REST, SOAP, CORBA HOP, RMI, DCOM and Web Services.

Computer systems 602, 604 and 606 may include mobile devices such as cellular telephones. The communication network may further employ one or more mobile access technologies including 2nd (2G), 3rd (3G), 4th (4G or LTE) generation radio access for cellular systems, WLAN, Wireless Router (WR) mesh, and other communication technologies. Access technologies such as 2G, 3G, 4G and LTE and future access networks may enable wide area coverage for mobile devices. For example, the network may enable a radio connection through a radio network access such as Global System for Mobil communication (GSM), General Packet Radio Services (GPRS), Enhanced Data GSM Environment (EDGE), Wideband Code Division Multiple Access (WCDMA), among other communication standards. Network may include any wireless communication mechanism by which information may travel between the devices 604 and other computing devices in the network.

To ensure data transfer is secure, the computer systems 602, 604 and 606 may transmit data via the network 608 using a variety of security measures including TSL, SSL or VPN, among other security techniques. While the distributed computer system 600 illustrates three networked computer systems, the distributed computer system 600 may include any number of computer systems, networked using any medium and communication protocol.

Various aspects and functions in accord with the present invention may be implemented as specialized hardware or software executing in one or more computer systems including the computer system 602 shown in FIG. 6. As depicted, the computer system 602 includes a processor 610, a memory 612, a bus 614, an interface 616 and a storage system 618. The processor 610, which may include one or more microprocessors or other types of controllers, can perform a series of instructions that manipulate data. The processor 610 may be a well-known, commercially available processor such as an Intel Pentium, Intel Atom, ARM Processor, Motorola PowerPC, SGI MIPS, Sun UltraSPARC, or Hewlett-Packard PA-RISC processor, or may be any other type of processor or controller as many other processors and controllers are available. As shown, the processor 610 is connected to other system placements, including a memory 612, by the bus 614.

The memory 612 may be used for storing programs and data during operation of the computer system 602. Thus, the memory 612 may be a relatively high performance, volatile, random access memory such as a dynamic random access memory (DRAM) or static memory (SRAM). However, the memory 612 may include any device for storing data, such as a disk drive or other non-volatile storage device, such as flash memory or phase-change memory (PCM). Various embodiments in accord with the present invention can organize the memory 612 into particularized and, in some cases, unique structures to perform the aspects and functions disclosed herein.

Components of the computer system 602 may be coupled by an interconnection element such as the bus 614. The bus 614 may include one or more physical busses (for example, busses between components that are integrated within a same machine), and may include any communication coupling between system placements including specialized or standard computing bus technologies such as IDE, SCSI, PCI and InfiniBand. Thus, the bus 614 enables communications (for example, data and instructions) to be exchanged between system components of the computer system 602.

Computer system 602 also includes one or more interfaces 616 such as input devices, output devices and combination input/output devices. The interface devices 616 may receive input, provide output, or both. For example, output devices may render information for external presentation. Input devices may accept information from external sources. Examples of interface devices include, among others, keyboards, mouse devices, trackballs, microphones, touch screens, printing devices, display screens, speakers, network interface cards, etc. The interface devices 616 allow the computer system 602 to exchange information and communicate with external entities, such as users and other systems.

Storage system 618 may include a computer-readable and computer-writeable nonvolatile storage medium in which instructions are stored that define a program to be executed by the processor. The storage system 618 also may include information that is recorded, on or in, the medium, and this information may be processed by the program. More specifically, the information may be stored in one or more data structures specifically configured to conserve storage space or increase data exchange performance. The instructions may be persistently stored as encoded signals, and the instructions may cause a processor to perform any of the functions described herein. A medium that can be used with various embodiments may include, for example, optical disk, magnetic disk or flash memory, among others. In operation, the processor 610 or some other controller may cause data to be read from the nonvolatile recording medium into another memory, such as the memory 612, that allows for faster access to the information by the processor 610 than does the storage medium included in the storage system 618. The memory may be located in the storage system 618 or in the memory 612. The processor 610 may manipulate the data within the memory 612, and then copy the data to the medium associated with the storage system 618 after processing is completed. A variety of components may manage data movement between the medium and the memory 612, and the invention is not limited thereto.

Further, the invention is not limited to a particular memory system or storage system. Although the computer system 602 is shown by way of example as one type of computer system upon which various aspects and functions in accord with the present invention may be practiced, aspects of the invention are not limited to being implemented on the computer system, shown in FIG. 6. Various aspects and functions in accord with the present invention may be practiced on one or more computers having different architectures or components than that shown in FIG. 6. For instance, the computer system 602 may include specially-programmed, special-purpose hardware, such as for example, an application-specific integrated circuit (ASIC) tailored to perform a particular operation disclosed herein. Another embodiment may perform the same function using several general-purpose computing devices running MAC OS System X with Motorola PowerPC processors and several specialized computing devices running proprietary hardware and operating systems.

The computer system 602 may include an operating system that manages at least a portion of the hardware placements included in computer system 602. A processor or controller, such as processor 610, may execute an operating system which may be, among others, a Windows-based operating system (for example, Windows NT, Windows 2000/ME, Windows XP, Windows 7, or Windows Vista) available from the Microsoft Corporation, a MAC OS System X operating system available from Apple Computer, one of many Linux-based operating system distributions (for example, the Enterprise Linux operating system available from Red Hat Inc.), a Solaris operating system available from Sun Microsystems, or a UNIX operating systems available from various sources. Many other operating systems may be used, and embodiments are not limited to any particular operating system.

The processor and operating system together define a computing platform for which application programs in high-level programming languages may be written. These component applications may be executable, intermediate (for example, C# or JAVA bytecode) or interpreted code which communicate over a communication network (for example, the Internet) using a communication protocol (for example, TCP/IP). Similarly, functions in accord with aspects of the present invention may be implemented using an object-oriented programming language, such as SmallTalk, JAVA, C++, Ada, or C# (C-Sharp). Other object-oriented programming languages may also be used. Alternatively, procedural, scripting, or logical programming languages may be used.

Additionally, various functions in accord with aspects of the present invention may be implemented in a non-programmed environment (for example, documents created in HTML, XML or other format that, when viewed in a window of a browser program, render aspects of a graphical-user interface or perform other functions). Further, various embodiments in accord with aspects of the present invention may be implemented as programmed or non-programmed placements, or any combination thereof. For example, a web page may be implemented using HTML while a data object called from within the web page may be written in C++. Thus, the invention is not limited to a specific programming language and any suitable programming language could also be used.

It is to be appreciated that embodiments of the methods and apparatuses discussed herein are not limited in application to the details of construction and the arrangement of components set forth in the following description or illustrated in the accompanying drawings. The methods and apparatuses are capable of implementation in other embodiments and of being practiced or of being carried out in various ways. Examples of specific implementations are provided herein for illustrative purposes only and are not intended to be limiting. In particular, acts, elements and features discussed in connection with any one or more embodiments are not intended to be excluded from a similar role in any other embodiments.

Also, the phraseology and terminology used herein is for the purpose of description and should not be regarded as limiting. Any references to embodiments or elements or acts of the systems and methods herein referred to in the singular may also embrace embodiments including a plurality of these elements, and any references in plural to any embodiment or element or act herein may also embrace embodiments including only a single element. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. Any references to front and back, left and right, top and bottom, upper and lower, and vertical and horizontal are intended for convenience of description, not to limit the present systems and methods or their components to any one positional or spatial orientation.

Having thus described several aspects of at least one embodiment of this invention, it is to be appreciated that various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A computer-implemented method of processing diacritic marks in detected text using optical character recognition (OCR), the method comprising:
   receiving, by a computer system, an electronic image containing text including a plurality of diacritics;
   analyzing, by the computer system, the electronic image to generate a plurality of bounding blocks associated with text within the electronic image, wherein the plurality of bounding blocks include at least a base text bounding box and a diacritic bounding box;
   determining a base box distance between the diacritic bounding box and a nearest base text bounding box;
   analyzing the plurality of bounding blocks to determine a plurality of text lines;
   determining a proximity value for the diacritic bounding box to a nearest text line of the plurality of text lines;
   associating, by the computer system, the diacritic bounding box with a corresponding text line based on the proximity value and the base box distance, whereby the diacritic bounding box association is thus made responsive to a determination of multiple distance values, namely the proximity value and the base box distance; and
   processing the plurality of bounding blocks to produce electronic text from the electronic image.

2. The method according to claim 1, wherein the act of analyzing the plurality of bounding blocks to determine the plurality of text lines includes an act of generating a text line density map of the plurality of text lines.

3. The method according to claim 2, further comprising an act of determining a bulk text line value for at least one text line based on the text line density map.

4. The method according to claim 3, wherein the act of determining the proximity value for the diacritic bounding box to the nearest text line of the plurality of text lines includes an act of determining the proximity value between the diacritic hounding box and the bulk text line value.

5. The method according to claim 1, wherein associating the diacritic bounding box with the corresponding text line based on the proximity value and the base box distance includes an act of evaluating the proximity value and the base box distance for the diacritic to determine a shortest distance.

6. The method according to claim 5, wherein the act of determining the proximity value for the diacritic bounding box to the nearest text line of the plurality of text lines includes determined proximity values for at least two proximate text lines to establish the nearest text line.

7. The method according to claim 6, further comprising an act of assigning a weight to the proximity values determined for the at least two proximate text lines.

8. The method according to claim 7, wherein the weight is configured to favor identification of downhill text lines over identification of uphill text lines as the nearest text line.

9. The method according to claim 6, wherein the predetermined parameters include at least one of favoring assignment of the diacritic bounding box to a corresponding text line, wherein the corresponding text line is positioned below the diacritic, disfavoring assignment of the diacritic bounding box to the corresponding text line, wherein the corresponding text line is positioned above the diacritic, and determining weight values for one or more of the proximity value and the base box distance based on identification of a source language for the electronic image.

10. The method according to claim 1, further comprising an act of assigning a weight value to at least one of the base box distance and the proximity value based on predetermined parameters.

11. A system for processing diacritic marks in detected text using optical character recognition (OCR), the system comprising:
   at least one processor operatively connected to a memory, the processor when executing is configured to provide an OCR engine, wherein the OCR engine is configured to:
   receive an electronic image containing text including a plurality of diacritics;
   analyze the electronic image to generate a plurality of bounding blocks associated with text within the electronic image, wherein the plurality of bounding blocks include at least a base text bounding box and a diacritic bounding box;
   determine a base box distance between the diacritic bounding box and a nearest base text bounding box;
   analyze the plurality of bounding blocks to determine a plurality of text lines;
   determine a proximity value for the diacritic bounding box to a nearest text line of the plurality of text lines;
   associate the diacritic bounding box with a corresponding text line based on the proximity value and the base box distance, whereby the diacritic bounding box association is thus made responsive to a determination of multiple distance values, namely the proximity value and the base box distance; and
   process the plurality of bounding blocks to produce electronic text from the electronic image.

12. The system according to claim 11, wherein, the OCR engine is further configured to generate a text line density map of the plurality of text lines to determine the plurality of text lines.

13. The system according to claim 12, wherein the OCR engine is further configured to determine a hulk text line value for at least one text line based on the text line energy map.

14. The system according to claim 13, wherein the OCR engine is further configured to determine the proximity value for the nearest text line between the diacritic bounding box and the bulk text line value.

15. The system according to claim 11, wherein the OCR engine is further configured to evaluate the proximity value and the base box distance for the diacritic to determine a shortest distance in order to associate the diacritic bounding box with the corresponding text line based on the proximity value and the base block distance.

16. The system according to claim 15, wherein the OCR engine is further configured to determine proximity values for at least two proximate text lines to establish the nearest text line.

17. The system according to claim 16, wherein the OCR engine is further configured to assign a weight to the proximity values determined for the at least two proximate text lines.

18. The system according to claim 17, wherein the weight is configured to favor identification of downhill text lines over identification of uphill text lines as the nearest text line.

19. The system according to claim 16, wherein the predetermined parameters include at least one of favoring assignment of the diacritic bounding box to a corresponding text line, wherein the corresponding text line is positioned below the diacritic, disfavoring assignment of the diacritic bounding box to the corresponding text line, wherein the corresponding text line is positioned above the diacritic, and determining weight values for one or more of the proximity value and the base box distance based on identification of a source language for the electronic image.

20. The system according to claim 11, wherein the OCR engine is further configured to assign a weight value to at least one of the base block distance and the proximity value based on predetermined parameters.

21. A non-transitory computer readable medium having stored thereon sequences of instruction for causing a computer to perform a method for processing diacritic marks in detected text using optical character recognition (OCR), the method comprising:

receiving an electronic image containing text including a plurality of diacritics;

analyzing the electronic image to generate a plurality of bounding blocks associated with text within the electronic image, Wherein the plurality of bounding blocks include at least a base text bounding box and a diacritic bounding box;

determining a base box distance between the diacritic bounding box and a nearest base text bounding box;

analyzing the plurality of bounding blocks to determine a plurality of text lines;

determining a proximity value for the diacritic bounding box to a nearest text line of the plurality of text lines;

associating the diacritic bounding box with a corresponding text line based on the proximity value and the base box distance, whereby the diacritic bounding box association is thus made responsive to a determination of multiple distance values, namely the proximity value and the base box distance; and processing the plurality of bounding blocks to produce electronic text from the electronic image.

\* \* \* \* \*

UNITED STATES PATENT AND TRADEMARK OFFICE
CERTIFICATE OF CORRECTION

PATENT NO.       : 8,977,057 B1
APPLICATION NO.  : 13/672802
DATED            : March 10, 2015
INVENTOR(S)      : Smith Page 1 of 1

It is certified that error appears in the above-identified patent and that said Letters Patent is hereby corrected as shown below:

Claims
Column 19, Line 59, claim 4, after word "diacritic", please delete "hounding" and insert --bounding--.
Column 20, Line 51, claim 12, after word "wherein", please delete ",".
Column 20, Line 56, claim 13, after word "a", please delete "hulk" and insert --bulk--.
Column 22, Line 8, claim 21, after word "image,", please delete "Wherein" and insert --wherein--.

Signed and Sealed this
Fifth Day of July, 2016

Michelle K. Lee
*Director of the United States Patent and Trademark Office*